United States Patent [19]

Meyer, Jr. et al.

[11] 4,329,270

[45] May 11, 1982

[54] COMPOSITIONS CONTAINING PLASTICIZED POLY(VINYL CHLORIDE) WHICH COMPOSITIONS HAVE IMPROVED PHYSICAL PROPERTIES

[75] Inventors: Max F. Meyer, Jr.; Richard L. McConnell; Frederick B. Joyner, all of Kingsport, Tenn.

[73] Assignee: Eastman Kodak Company, Rochester, N.Y.

[21] Appl. No.: 183,880

[22] Filed: Sep. 4, 1980

[51] Int. Cl.$^3$ .................. C08K 5/10; C08L 45/00
[52] U.S. Cl. .................................... 524/518; 525/210
[58] Field of Search .................. 260/31.8 M; 525/210

[56] References Cited

U.S. PATENT DOCUMENTS

| | | | |
|---|---|---|---|
| 3,954,908 | 5/1976 | Nakamura et al. | 525/316 |
| 3,991,139 | 11/1976 | Kokuryo | 525/2 |
| 4,021,510 | 5/1977 | Ueshima et al. | 525/210 |
| 4,028,482 | 6/1977 | Ueshima et al. | 525/207 |
| 4,132,750 | 1/1979 | Ueshima et al. | 525/209 |
| 4,140,731 | 2/1979 | Nakamura et al. | 525/210 |

OTHER PUBLICATIONS

Chem. Abs. 33933q, vol. 85 (1976), Nakamura et al, Japan 76-11845, Showa "Norbornene Deriv. . . ."
Chem. Abs. 40413q, vol. 87 (1977), Koburyo et al, Japan 77-47879, Showa "Laminated Films".
Chem. Abs. 106577p, vol. 84 (1976), Nakamura et al, Japan 75-148462, Showa "Impact Resistant . . ."
"Polymer Mol. WT Methods" Erzin Ed. Adv. in Chem. #123, pp. 98-107 Nakajima.
"Charact. of MWT Det. in Hi Polym" JPSPTC, pp. 161-178, Billmeyer.

*Primary Examiner*—Herbert J. Lilling
*Attorney, Agent, or Firm*—Clyde L. Tootle; Daniel B. Reece, III

[57] ABSTRACT

This invention is directed to blends of polymers of 2-substituted norbornenes such as poly(2-methoxycarbonyl-5-norbornene) and plasticized poly(vinyl chloride). These blends provide plasticized poly(vinyl chloride) compositions having high clarity as well as improved low temperature flexibility and improved low temperature impact strength.

16 Claims, No Drawings

COMPOSITIONS CONTAINING PLASTICIZED POLY(VINYL CHLORIDE) WHICH COMPOSITIONS HAVE IMPROVED PHYSICAL PROPERTIES

This invention is directed to blends of polymers of 2-substituted norbornenes such as poly(2-methoxycarbonyl-5—norbornene) and plasticized poly(vinyl chloride). These blends provide plasticized poly(vinyl chloride) compositions having high clarity as well as improved low temperature flexibility and improved low temperature impact strength.

Plasticized poly(vinyl chloride) is a clear tough plastic that is used extensively in the form of film, sheeting and molded objects as well as for extrusion coating or calender coating of a variety of substrates such as paper, foil, fabric and the like. However, plasticized poly(vinyl chloride) has certain serious disadvantages including poor low temperature impact strength, poor low temperature flexibility and poor solvent extraction resistance. The low temperature flexibility and impact strength of poly(vinyl chloride) can be improved by the addition of very high concentrations of plasticizers. However, such high concentrations of plasticizers reduces the stiffness of the compositions at ambient temperature to unacceptably low levels and it also increases the plasticizer migration and loss problem. Therefore, while plasticized poly(vinyl chloride) is a very useful polymer for many applications requiring good clarity and flexibility, the low temperature flexibility and impact strength properties of plasticized poly(vinyl chloride) are inadequate in many cases. Therefore, it would be an advance in the state of the art to provide processable compositions containing poly(vinyl chloride) which are capable of being formed into objects having high clarity and flexibility as well as good low temperature flexibility and impact strength.

In accordance with the present invention, it was found that the addition of a polar substituted polynorbornene such as poly(2-methoxycarbonyl-5-norbornene) plasticized to poly(vinyl chloride) provides compositions having significant improvements in low temperature flexibility and impact strength at a given plasticizer loading without affecting the clarity of the plasticized polyvinyl chloride. The presence of the norbornene polymer also causes a substantial reduction in the density of the composition. Since it is known that polar substituted polynorbornenes are highly incompatible with a wide range of polymers such as polyethylene, polypropylene, polystyrene, nylon, polycarbonate and polyesters, it was unobvious and unexpected that blends of these polar substituted polynorbornenes with plasticized poly(vinyl chloride) would give glass-clear films and molded objects having improved properties.

The polar substituted polynorbornenes operable in this invention are comprised predominantly of structural units represented by the following general formula:

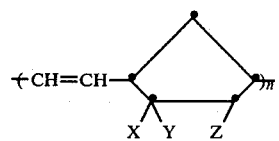

wherein X, Y and Z are functional groups or radicals in the following combinations:

| X | Y | Z |
| --- | --- | --- |
| —COOR | H | H |
| —COOR | —CH$_3$ | H |
| —COOR | H | —COOR |
| —CH$_2$OC(O)—CH$_3$ | H | H |
| —OC(O)CH$_3$ | H | H |

R is a hydrocarbyl group containing 1 to 8 carbon atoms and include both alkyl and aralkyl radicals; and n is an integer of from 10 to 5000.

The polar substituted norbornene monomers used to prepare such polar substituted polynorbornenes useful in the practice of this invention are readily prepared in a Diels Alder reaction of cyclopentadiene with the appropriate dienophile. Useful dienophiles include vinyl acetate, $C_1$ to $C_8$ esters of acrylic and methacrylic acid, allyl acetate, $C_1$ to $C_8$ esters of maleic acid and the like. The substituted norbornene monomers would include, for example, 2-acetoxy-5-norbornene, 2-methoxycarbonyl-5-norbornene, 2-ethoxycarbonyl-5-norbornene, 2-octoxycarbonyl-5-norbornene, 2(2-ethylhexoxy)-5-norbornene, 2-methoxycarbonyl-2-methyl-5-norbornene, 2-ethoxycarbonyl-2-methyl-5-norbornene, 2-acetoxymethyl-5-norbornene, dimethyl 5-norbornene-2,3-dicarboxylate and the like. The polar substituted polynorbornenes can be prepared by a ring opening polymerization process carried out in hydrocarbon or chlorinated hydrocarbon solvents at temperatures ranging from about 20° to about 90° C. using mixed catalysts such as a $WCl_6$-$Et_2AlCl$-diethyl acetal catalyst (1:6:3 molar ratio). Useful solvents include toluene, 1,2-dichloroethane, tetrachloroethane, methylene chloride and the like. The inherent viscosity (I.V.) of these polar substituted polynorbornenes in a 40/25/35 p-chlorophenolphenol tetrachloroethane solvent at 125° C. may range from about 0.8 to about 3.7 but preferably range from about 0.9 to about 2.5. The glass transition temperature (Tg) values of these polymers range from about 20° to about 85° C. when measured with a Differential Scanning Calorimeter Model II instrument.

The poly(vinyl chloride) suitable for use in these compositions is a plastic grade, high molecular weight (30,000 to 200,000 number average mol wt.) polymer stabilized with a conventional PVC stabilizer such as the commercially available barium-cadmium-zinc stabilizer sold as Mark 2018 and also the commercially available epoxidized soybean oil. Generally, the stabilizers are employed in an amount of about 3 phr to about 5 phr.

The blends contain 5 to 80, preferably 10 to 75, most preferably 25 to 75 weight percent polynorbornene. Compositions containing less than 5% polynorbornene do not have the desirable low temperature properties. Compositions having more than 80% polynorbornene have undesirable mold shrinkage.

Conventional plasticizer generally used for preparing plasticized poly(vinyl chloride) compositions are useful in the present invention and are used in an amount of about 5 phr to 30 phr. Preferred plasticizers suitable for use in these compositions are the well known phthalate-ester plasticizers such as diethyl, dibutyl, and dioctyl phthalate. Mixtures of such plasticizers can also be used. Small amounts of plasticizers such as dioctyl adipate, dioctyl azelate, dioctyl sebacate and tri-2-ethylhexyl trimellitate (Kodaflex TOTM) can be used but they tend to exude at high concentrations (30%) and cause a loss in clarity. In addition, it is desirable for the blends to contain about 0.1 percent to about 1.5 percent by weight, preferably about 0.25 percent to 1.0 percent by weight, of one or more antioxidants. Antioxidants that are effective for the polynorbornene component can be used. Such antioxidants include, for example, tris(di-t-butyl-p-hydroxybenzyl)trimethylbenzene (Ionox 220 and 330), 6-di(t-butyl)-p-cresol (Dalpac 4C2), alkylated bisphenol (Naugawhite), zinc dibutyl dithiocarbamate (Butyl Zimate), 4,4'-methylene bis(2,6-di-tert-butylphenol) (Ethyl 702), tetrakis[methylene(3,5-di-tert-butyl-4-hydroxyhydrocinnamate)methane] (Irganox 1010), and dilauryl 3,3'-thiodipropionate (Plastanox DLTDP).

This invention will be further illustrated by the following examples although it will be understood that these examples are included merely for purposes of illustration and are not intended to limit the scope of the invention.

EXAMPLE 1

Dry, distilled toluene (1200 ml) is passed through a column packed with activated 4 Å molecular sieve and into a dry, nitrogen-swept 4-neck, 3-liter, round bottom flask equipped with a catalyst dropping funnel, a monomer dropping funnel and a mechanical stirrer. 2-Methoxycarbonyl-5-norbornene (300 g) containing 1.68 g of 1-hexene (chain transfer agent) is added under nitrogen from the monomer dropping funnel (which is charged in the dry box). The catalyst for this reaction is prepared and loaded in the catalyst dropping funnel in a nitrogen-swept dry box in the following manner. Dry toluene (125 ml) is added first, followed by 0.254 g $WCl_6$, 0.228 g diethyl acetal and 0.456 g $Et_2AlCl$ (mole ratio of 1:6:3). This catalyst solution is added rapidly to the toluene-monomer-1-hexene mixture with rapid stirring under an inert, dry, nitrogen atmosphere. Polymerization begins almost immediately. The reaction is allowed to proceed for 1 hour at a temperature of 24°–40° C. The polymer is washed in isobutyl alcohol containing about 1% 2,4-pentanedione and then in methanol. The polymer is stabilized with 0.5% Irganox 1010 and dried under vacuum at 85° C. The I.V. of the dried polymer in a 40/25/35 p-chlorophenolphenol-tetrachloroethane mixture is 1.37. The polymer has a glass transition temperature (2nd DSC heating cycle of 71° C.). Other substituted norbornene monomers are polymerized in a manner similar to that described above.

EXAMPLE 2

A dry blend of 117.9 g of poly(vinyl chloride) having a number average molecular weight of 58,000 and an inherent viscosity of 0.92 (ASTM D1243), 3.64 g of epoxidized soybean oil such as Paraplex G-62 and 3.64 g of barium-cadmium-zinc stabilizer (such as Mark 2018) is prepared in a Henschel mixer. This dry blend and 41.67 g of poly(2-methoxycarbonyl-5-norbornene) (prepared as described in Example 1) having a glass transition temperature of 71° C. and an I.V. of 1.37 in a 40/25/35 p-chlorophenol-phenol-tetrachloroethanol mixture and 33.31 g of dioctyl phthalate are blended on a two-roll mixing mill at 165° C. A control blend of 100 g of poly(vinyl chloride), 3.0 g of epoxidized soybean oil, 3.0 g of barium-cadmium-zinc stabilizer and 20 g of dioctyl phthalate is also prepared on the two roll mill at 165° C. Test specimens of the control and the blend are injection molded on a laboratory Watson-Stillman molding machine at a melt temperature of 175° C., pressure of 1000 psi and mold temperature of 23° C. The properties of the poly(vinyl chloride) control and the blend of poly(vinyl chloride) and poly(2-methoxycarbonyl-5-norbornene) are given in Table 1. The addition of 25 wt. % of poly(2-methoxycarbonyl-5-norbornene) to the plasticized polyvinyl chloride) provides a very clear composition similar to the control with a significant reduction in stiffness (114,500 to 52,500 psi), Clash-Berg stiffness (24° to 11° C.) and a significant increase in both notched Izod impact strength at 23° C. (0.8 to 1.2 ft. lb./in.) and unnotched Izod impact strength at −29° C. (8.3 to 12.1 ft. lb./in.).

EXAMPLE 3

The procedure of Example 2 is followed except that 83.35 g of the poly(vinyl chloride) (I.V. 0.92; number average molecular weight 58,000; containing 3 phr of epoxidized soybean oil and 3 phr of barium-cadium-zinc stabilizer) and 83.35 g of poly(2-methoxycarbonyl-5-norbornene), I.V.=1.37 in a 40/25/35 p-chlorophenol-phenol-tetrachloroethane mixture at 125° C., prepared as described in Example 1, and 33.30 g of dioctyl phthalate are blended on a two roll mill, and injection molded into test specimens. The properties of this blend are given in Table 1. The addition of 50 wt. % poly(2-methoxycarbonyl-5-norbornene to poly(vinyl chloride) (at a loading of 20 phr of dioctyl phthalate) provides a very clear composition comparable to the control sample of poly(vinyl chloride) with a very significant reduction in stiffness (114,500 to <12,000 psi) and also a significant reduction in Clash-Berg stiffness (24° to 7° C.). The notched izod impact strength of this blend is high (40% hinge break, 0.7 ft. lb./in.; 60% no break, 12.6 ft. lb./in. compared to 100% complete break, 0.8 ft. lb./in. for the control). The unnotched izod impact strength at −29° C. of this blend is 11.9 ft. lb./in. (100% complete break) compared to 8.3 ft. lb./in. (100% complete break) for the control.

Similarly good results are obtained using a poly(vinyl chloride) polymer having a molecular weight of 200,000.

EXAMPLE 4

The procedure of Example 2 is followed except that 41.67 g of poly(vinyl chloride) (I.V. 0.92; number average molecular weight 58,000) (containing 3 phr of epoxidized soybean oil and 3 phr of barium-cadmium-zinc stabilizer), 125.02 g of poly(2-methoxycarbonyl-5-norbornene) (prepared as described in Example 1) and 33.31 g of dioctyl phthalate are blended on a two-roll mill. This blend is injection molded into test specimens. The properties of this blend are given in Table 1 and show that a composition containing 75 wt. % poly(2-methoxycarbonyl-5-norbornene) and 25 wt. % poly(vinyl chloride) is very flexible at room temperature, has improved low temperature flexibility as shown by the Clash-Berg stiffness test and significantly improved notched izod impact strength at 23° C. and unnotched izod impact strength at −29° C. compared to the PVC control. The clarity of this composition is comparable to that of the plasticized poly(vinyl chloride) control.

Similarly good results are obtained using a poly(vinyl chloride) polymer having a molecular weight of 38,000.

EXAMPLE 5

Ten grams of poly(2-methoxycarbonyl-5-norbornene) prepared as described in Example 1 and 10 g of poly(vinyl chloride) (I.V. 0.92; number average molecular weight 58,000; containing 3 phr of epoxidized soybean oil and 3 phr of barium-cadium-zinc stabilizer) are placed with 200 ml of methyl ethyl ketone solvent in a 500 ml 3-neck, round bottom flask equipped with a mechanical stirrer, condenser and nitrogen purge. The solution is heated with stirring until the polymers dissolve. The solution is poured into an evaporating dish and vacuum stripped at 50°-60° C. in a vacuum oven at about 0.5 mm pressure until all of the solvent has been removed. A 1/16-in. compression molded plate of this blend is clear, compatible and has a single glass transition temperature (2nd cycle in DSC II unit) of 68° C. The plate has a very high modulus and is tough.

EXAMPLE 6

The procedure of Example 2 is followed except that 50 g of poly(2-methoxycarbonyl-5-norbornene), 50 g of poly(vinyl chloride) (I.V. 0.92; number average molecular weight 58,000) and 5 g of dioctyl phthalate are blended and tested. The blend is compatible, clear, has a glass transition temperature of 55° C. and has a higher stiffness and hardness than the blend described in Example 3 containing 20 phr of dioctyl phthalate.

EXAMPLE 7

The procedure of Example 2 is repeated using 50 g of poly(2-methoxycarbonyl-5-norbornene), 50 g of poly(vinyl chloride) and 30 g of dioctyl phthalate. This blend is clear, very flexible and has a glass transition temperature of 13° C. This example illustrates that these blends can be highly plasticized to provide clear, highly flexible compositions. After molded specimens are aged for 30 days at 23° C., there is no evidence of plasticizer exudation.

EXAMPLE 8

The procedure of Example 2 is repeated using 33.31 g of diethyl phthalate in place of the dioctyl phthalate. The blend is compatible and clear. The reduction in stiffness and improvement in low temperature flexibility and impact strength are comparable to that obtained in Example 2.

EXAMPLE 9

The procedure of Example 2 is followed except that 41.67 g of poly(2-ethoxycarbonyl-5-norbornene) is used in place of the poly(2-methoxycarbonyl-5-norbornene). The composition is clear and compatible. The reduction in stiffness and improvement in low temperature flexibility and impact strength are comparable to that obtained in Example 2.

EXAMPLE 10

The procedure of Example 2 is followed except that 41.67 g of poly(2-octyloxycarbonyl-5-norbornene) is used in place of the poly(2-methoxycarbonyl-5-norbornene). The composition is clear and compatible. The reduction in stiffness and the improvement in low temperature flexibility and impact strength are comparable to that obtained in Example 2.

EXAMPLE 11

The procedure of Example 2 is repeated except that 41.67 g of poly(2-methoxycarbonyl-2-methyl-5-norbornene) is used in place of the poly(2-methoxycarbonyl-5-norbornene). The composition is clear and compatible. The reduction in stiffness and improvement in low temperature flexibility and impact strength are comparable to that obtained in Example 2.

EXAMPLE 12

The procedure of Example 2 is followed except that 41.67 g of poly(2-acetoxy-5-norbornene) is used in place of the poly(2-methoxycarbonyl-5-norbornene). The blend is clear and compatible. The reduction in stiffness and improvement in low temperature flexibility and impact strength are comparable to that obtained in Example 2.

EXAMPLE 13

The procedure of Example 2 is repeated except that 41.67 g of poly(2-acetoxymethyl-5-norbornene), glass transition temperature of 28° C., is used in place of the poly(2-methoxycarbonyl-5-norbornene). This blend has a lower glass transition temperature (12° C.) and even greater flexibility at low temperatures than the blend described in Example 2. This blend is clear, compatible and provides a reduction in stiffness at 23° C. and improvement in impact strength comparable to that obtained in Example 2.

EXAMPLE 14

The procedure of Example 2 is repeated except that 41.67 g of poly(dimethyl-5-norbornene-2,3-dicarboxylate) is used in place of the poly(2-methoxycarbonyl-5-norbornene). The blend is clear and compatible. The reduction in stiffness and improvement in low temperature flexibility and impact strength are comparable to that obtained in Example 2.

EXAMPLE 15

Poly(2-methoxycarbonyl-5-norbornene) (8 g) and 32 g of Styron 686 polystyrene are melt blended at 200° C. in the Brabender Plastograph mixer. This blend is incompatible as indicated by the obvious appearance of two phases, the opaque nature of thin films of the blend and the presence of two glass transition temperatures (70° and 104° C.) which are characteristic of the respective homopolymers in the blend. Similar results are obtained when blends containing 30 and 50% concentrations of the poly(2-methoxycarbonyl-5-norbornene) are prepared. This shows the incompatibility of these polymers.

EXAMPLE 16

Poly(2-methoxycarbonyl-5-norbornene) (8 g.) and 32 g. of low density polyethylene are melt blended in the Brabender Plastograph mixer at 200° C. The blend is incompatible and opaque. Compression molded films of the blend are cheesy in nature and weak wherein films of the respective homopolymers are clear and tough. Similar results are obtained when blends containing 30 and 50% concentrations of poly(2-methoxycarbonyl-5-norbornene) are prepared. This shows the incompatibility of these polymers.

EXAMPLE 17

Poly(2-methoxycarbonyl-5-norbornene) (8 g.) and 32 poly(2-methoxycarbonyl-5-norbornene) in polycarbonate are prepared. This shows the incompatibility of these polymers.

TABLE 1
PROPERTIES OF PLASTICIZED POLY(2-METHOXYCARBONYL-5-NORBORNENE)/-POLY(VINYL CHLORIDE) BLENDS

| Example | Control | 2 | 3 | 4 | 5 | Control |
|---|---|---|---|---|---|---|
| Poly(2-Methoxycarbonyl-5-Norbornene) Concn., Wt. % | 0 | 5 | 25 | 50 | 75 | 100 |
| Dioctyl Phthalate Concn., Phr | 20 | 20 | 20 | 20 | 20 | 0 |
| Wt. % | 16.7 | 16.7 | 16.7 | 16.7 | 16.7 | 0 |
| Density$^a$, g/ml | 1.308 | 1.295 | 1.250 | 1.148 | 1.198 | 1.124 |
| Glass Transition Temperature$^b$, °C. | 32 | 37 | 35 | 30 | 33 | 74 |
| Flexural Stiffness$^c$ | 114,500 | 89,800 | 52,500 | <12,000 | 21,100 | 191,000 |
| Clash-Berg Stiffness$^d$ | 24 | 23 | 11 | 7 | 13 | 48 |
| Hardness, Durometer | 77 | 77 | 73 | 64 | 71 | (R79) |
| Izod Impact Strength$^e$ Notched at 23° C., Ft. Lb./In. | 100% CB 0.8 | 100% CB 0.94 | 100% CB 1.2 | 40% HB 0.7 60% NB 13.6 | 20% CB 0.7 40% HB 0.7 40% NB 20.1 | 100% HB 1.6 |
| Notched at −29° C. Ft. Lb./In. | 100% CB 0.3 | 100% CB 0.94 | 100% CB 0.4 | 100% CB 0.4 | 100% CB 0.4 | 100% CB 0.5 |
| Unnotched at 23° C., Ft. Lb./In. | 100% NB 45.1 | 100% NB 42.6 | 100% NB 33.6 | 100% NB 24.2 | 100% NB 26.8 | 100% NB 29.8 |
| Unnotched at −29° C., Ft. Lb./In. | 100% CB 8.3 | 100% CB 8.6 | 100% CB 12.1 | 100% CB 11.9 | 100% CB 11.8 | 100% NB 30.5 |

$^a$Density Gradient Tube
$^b$Determined on DSC II instrument on 2nd heating cycle
$^c$ASTM-D747
$^d$ASTM-D1043
$^e$ASTM-D256, CB = Complete break, HB = Hinge break, NB = No break g. of semi-crystalline polypropylene are melt blended in the Brabender Plastograph mixer at 200° C.

Compression molded films of this blend are opaque and show evidence of substantial incompatibility by the presence of two glass transition temperatures (−9° and 73° C.) which are characteristic of the respective homopolymers in the blend.

Similar results are obtained when blends containing 30 and 50% poly(2-methoxycarbonyl-5-norbornene) with polypropylene are prepared. This shows the incompatibility of these polymers.

EXAMPLE 18

Poly(2-methoxycarbonyl-5-norbornene) (8 g.) and 32 g. of amorphous polypropylene are melt blended at 200° C. in the Brabender Plastograph mixer. The blend is incompatible as evidenced by the obvious appearance of two phases, the opaque nature of compression molded films and the presence of the glass transition temperatures of the respective homopolymers [−15° C. for amorphous polypropylene and 69° C. for poly(2-methoxycarbonyl-5-norbornene)] in the blend. Similar results are obtained when blends containing 30 and 50% poly(2-methoxycarbonyl-5-norbornene) are prepared. This shows the incompatibility of these polymers.

EXAMPLE 19

Poly(2-methoxycarbonyl-5-norbornene) (8 g.) and 32 g. of polycarbonate are dissolved in 400 ml of 1,2-dichloroethane with heating and stirring. The polymer solution is poured into an excess of methanol to precipitate the polymer blend. The polymer blend is filtered, stabilized with 0.1% Irganox 1010 and dried under vacuum at 50°-60° C. The blend is obviously incompatible since it contains two phases, and DSC thermograms show the presence of the glass transitions of the respective homopolymers [145° C. for polycarbonate and 78° C. for poly(2-methoxycarbonyl-5-norbornene)]. Similar results are obtained when blends containing 30 and 50%

The blends of the present invention provide poly(vinyl chloride) containing compositions which have good poly(vinyl chloride) properties and also have the added excellent low temperature flexibility and good impact strength properties.

The invention has been described in detail with particular reference to preferred embodiments thereof, but it will be understood that variations and modifications can be effected within the spirit and scope of the invention.

We claim:

1. A compatible plasticized poly(vinyl chloride) composition having excellent clarity and a flexural stiffness of 89,800 or less comprising: (1) a poly(vinyl chloride) having a molecular weight of 30,000 to 200,000 number average molecular weight, (2) about 5 phr to 30 phr plasticizer and (3) about 5 to 80 weight percent of a polar substituted polynorbornene consisting predominantly of repeating units having the formula

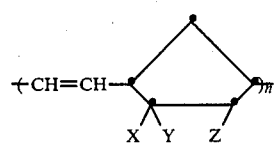

wherein X is a member selected from the group
—COOR;

or

where R is a hydrocarbyl group containing 1 to 8 carbon atoms, Y is hydrogen or methyl and Z is hydrogen or —COOR which is the same as for X and n is an integer of from 10 to 5,000.

2. Compatible polymer blends according to claim 1 wherein said polar substituted polynorbornene is poly(2-methoxycarbonyl-5-norbornene).

3. Compatible polymer blends according to claim 1 wherein said polar substituted polynorbornene is poly(2-ethoxycarbonyl-5-norbornene).

4. Compatible polymer blends according to claim 1 wherein said polar substituted polynorbornene is poly(2-octyloxycarbonyl-5-norbornene).

5. Compatible polymer blends according to claim 1 wherein said polar substituted polynorbornene is poly(2-methoxycarbonyl-2-methyl-5-norbornene).

6. Compatible polymer blends according to claim 1 wherein said polar substituted polynorbornene is poly(2-acetoxy-5-norbornene).

7. Compatible polymer blends according to claim 1 wherein said polar substituted polynorbornene is poly(2-acetoxymethyl-5-norbornene.

8. Compatible polymer blends according to claim 1 wherein said polar substituted polynorbornene is poly(-dimethyl-5-norbornene-2,3-dicarboxylate).

9. A compatible plasticized poly(vinyl chloride) composition having excellent clarity and a flexural stiffness of 89,800 or less comprising: (1) a poly(vinyl chloride) having a molecular weight of 30,000 to 200,000 number average molecular weight, (2) about 5 phr to 30 phr plasticizer and (3) about 25 to 75 weight percent of a polar substituted polynorbornene consisting predominantly of repeating units having the formula

wherein X is a member selected from the group —COOR;

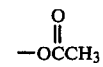

or

—OCCH₃ (with O double-bonded)

where R is a hydrocarbyl group containing 1 to 8 carbon atoms, Y is hydrogen or methyl and Z is hydrogen or —COOR which is the same as for X and n is an integer of from 10 to 5,000.

10. Compatible polymer blends according to claim 9 wherein said polar substituted polynorbornene is poly(2-methoxycarbonyl-5-norbornene).

11. Compatible polymer blends according to claim 9 wherein said polar substituted polynorbornene is poly(2-ethoxycarbonyl-5-norbornene).

12. Compatible polymer blends according to claim 9 wherein said polar substituted polynorbornene is poly(2-octyloxycarbonyl-5-norbornene).

13. Compatible polymer blends according to claim 9 wherein said polar substituted polynorbornene is poly(2-methoxycarbonyl-2-methyl-5-norbornene).

14. Compatible polymer blends according to claim 9 wherein said polar substituted polynorbornene is poly(2-acetoxy-5-norbornene).

15. Compatible polymer blends according to claim 9 wherein said polar substituted polynorbornene is poly(2-acetoxymethyl-5-norbornene.

16. Compatible polymer blends according to claim 9 wherein said polar substituted polynorbornene is poly(-dimethyl-5-norbornene-2,3-dicarboxylate).

* * * * *